United States Patent [19]
Gebauer et al.

[11] Patent Number: 5,498,053
[45] Date of Patent: Mar. 12, 1996

[54] RECIPROCATING PLATE MECHANISM

[75] Inventors: Paul Gebauer, St. Clair Shores; Jay R. White, Bloomfield Hills, both of Mich.

[73] Assignee: Jay Roberts Company, Bloomfield Hills, Mich.

[21] Appl. No.: 217,983

[22] Filed: Mar. 25, 1994

[51] Int. Cl.$^6$ .............................. B60J 3/00; F16H 19/02; F16H 19/04
[52] U.S. Cl. .............................. 296/97.5; 49/32; 49/360; 74/31; 476/15; 476/64; 476/66; 476/71
[58] Field of Search ........................ 74/31; 49/32, 360; 296/97.5; 476/15, 64, 66, 71

[56] References Cited

U.S. PATENT DOCUMENTS

| | | | |
|---|---|---|---|
| 1,246,823 | 8/1886 | Huber et al. | 74/31 X |
| 1,378,541 | 5/1921 | Huffman | 74/31 |
| 2,970,492 | 2/1961 | Gerlipp | 476/64 X |
| 3,263,367 | 8/1966 | Tanaka | 49/349 |
| 3,357,271 | 12/1967 | Nirenberg . | |
| 4,165,583 | 8/1979 | Meyer . | |
| 4,294,554 | 10/1981 | Mattsson . | |
| 4,411,165 | 10/1983 | Evans . | |
| 4,432,692 | 2/1984 | Breneman . | |
| 4,503,637 | 3/1985 | Parente . | |
| 4,638,676 | 1/1987 | Lively et al. . | |
| 4,648,011 | 3/1987 | Boote et al. | 296/97.5 X |
| 4,727,642 | 3/1988 | Christner et al. . | |
| 4,889,438 | 12/1989 | Forsyth et al. . | |
| 5,113,224 | 5/1992 | Tsuda et al. . | |
| 5,233,389 | 8/1993 | Deguchi et al. | 74/31 X |
| 5,267,002 | 11/1993 | Maitani et al. | 74/30 X |

FOREIGN PATENT DOCUMENTS 1077450  2/1958  Germany .................. 476/71

*Primary Examiner*—Allan D. Herrmann
*Attorney, Agent, or Firm*—Gifford, Krass, Groh, Sprinkle, Patmore, Anderson & Citkowski

[57] ABSTRACT

A reciprocating mechanism is provided with a motor rotating in one direction to produce forward and reverse motion by a drive wheel in direct contact with the forward and rear surfaces of an element such as a plate. The plate can take the form of a sliding door covering a vanity mirror in a vehicular sun visor.

14 Claims, 2 Drawing Sheets

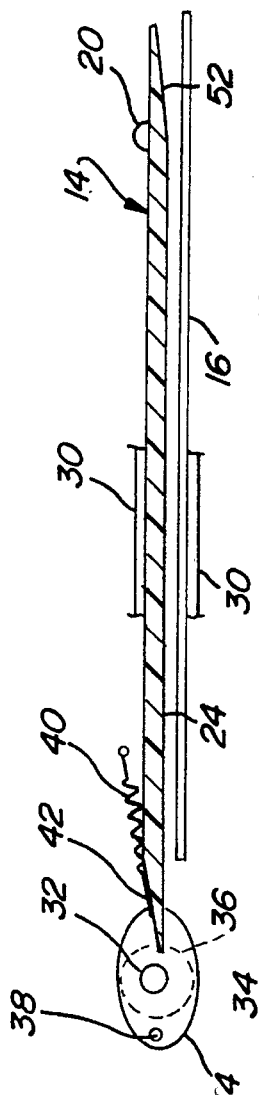
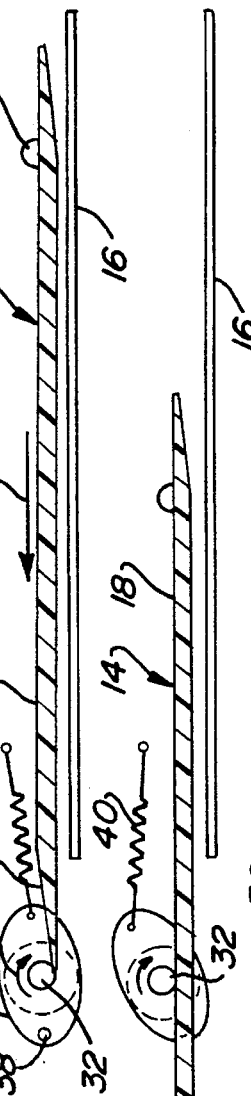
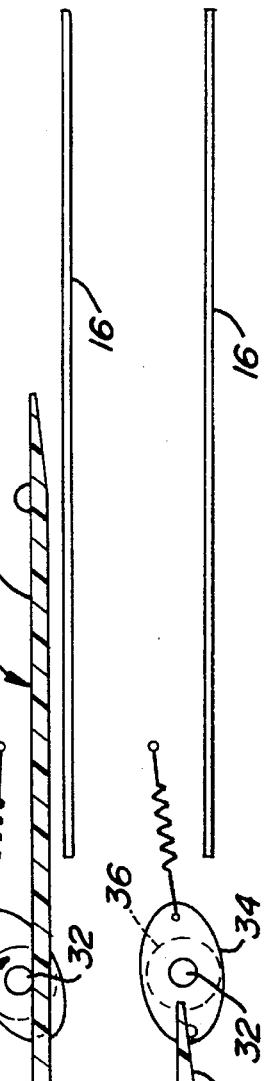
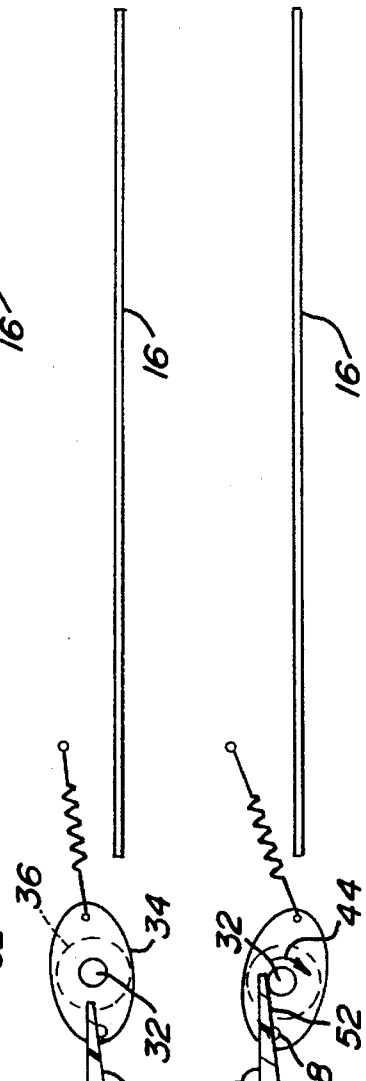
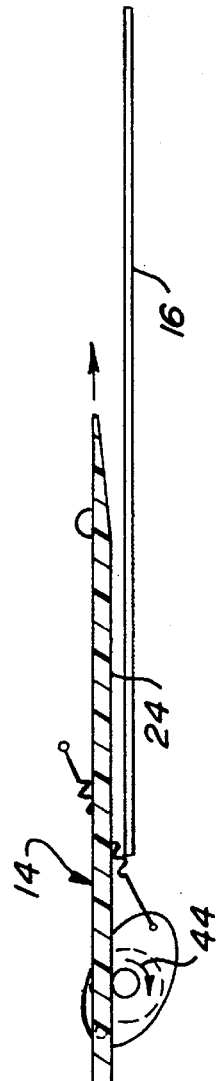

RECIPROCATING PLATE MECHANISM

BACKGROUND OF THE INVENTION

1. Field of the Invention

This invention relates to a reciprocating plate mechanism. More particularly, this invention relates to a reciprocating mechanism in which a rotary motor is used to reciprocate a plate-like element such as a sliding door covering and exposing a vanity mirror in a vehicular sun visor.

2. State of the Prior Art

There is almost an infinite number of mechanisms which reciprocate a plate-like elements such as a sliding door, panel, copy machine platen, or a compact disc carrier. Usually the element is in the form of a flat continuous plate having parallel front and reverse sides and the reciprocation is along a forward and reverse linear path. However, the element can be segmented, such as in certain garage door panels, or it can be curvilinear with parallel or non-parallel front and reverse sides, and the movement can be in curved or non-linear and have non-parallel paths between fixed end points.

Normally the rotary motor must be reversed or rotated in the opposite direction to provide forward and reverse motion requiring suitable switching circuitry. Also the conversion of the motor's rotary motion to the usual linear motion of the plate requires several, often complicated, elements such as chains, belts, levers, gears and the like.

SUMMARY OF THE INVENTION

The present invention provides a reciprocating mechanism which reciprocates all types of devices, elements or plates such as a sliding door having parallel front and rear surfaces by direct contact of a drive wheel with these front and rear surfaces along a longitudinally extending side of the device, eliminating complex intermediate members and utilizing a rotary motor that does not have to be reversed to obtain reciprocating forward and reverse linear motions.

The reciprocating mechanism of the invention includes a motor, a drive wheel rotated by the motor, an element having front and rear surfaces; and the means for maintaining the drive wheel in contact with the front surface for moving the element in a forward direction and for maintaining the drive wheel in contact with the rear surface for moving the element in the reverse direction. Biasing the drive wheel toward the element can be accomplished by pivotal mounting of the motor, which can also include a spring mounted to the motor, to maintain a force pivoting the motor toward the element. In another embodiment, the motor is stationary and the biasing toward the front and rear surfaces of the element can be accomplished by a resilient or flexible drive wheel or drive shaft.

A simple switch, typically in the form of a limit or proximity switch, can be used to actuate the motor for its forward or reverse operation. An illustrated embodiment of the invention is shown in a sliding door mechanism for a vehicular sun visor having a vanity mirror. The sliding door has a front and rear surface with the rear surface overlying the vanity mirror. The door is mounted so that when the drive wheel contacts one of the front or rear surfaces, the door is moved in a forward direction from a closed position covering the mirror to an open position exposing the mirror for use, and when the drive wheel contacts the other of the front and rear surface, the door is moved in a reverse direction from an open position to a closed position.

BRIEF DESCRIPTION OF THE DRAWING

The preferred embodiments of the invention are illustrated in the drawing in which:

FIGS. 2A–F are side view representations of the reciprocating door mechanism of FIG. 1 in consecutive stages of moving from a closed position, concealing a vanity mirror, to an open position, exposing the vanity mirror for use in which:

FIG. 2A shows the sliding door in its fully closed position concealing the mirror, and with the motor drive wheel out of contact with the door;

FIG. 2B shows the sliding door moved so that its front surface is in contact with the drive wheel;

FIG. 2C shows the drive wheel in contact with the front surface of the door moving the door from its closed position towards its open position;

FIG. 2D shows the door in its fully open position with the drive wheel out of contact with the door;

FIG. 2E shows the door having been pushed in a closing direction so that the motor drive wheel is in contact with the reverse surface of the door; and FIG. 2F is a view showing the sliding door being driven in the closing direction with the drive wheel in contact with the reverse surface of the door;

DETAILED DESCRIPTION OF THE PREFERRED EMBODIMENTS OF THE PRESENT INVENTION

Figure 1:
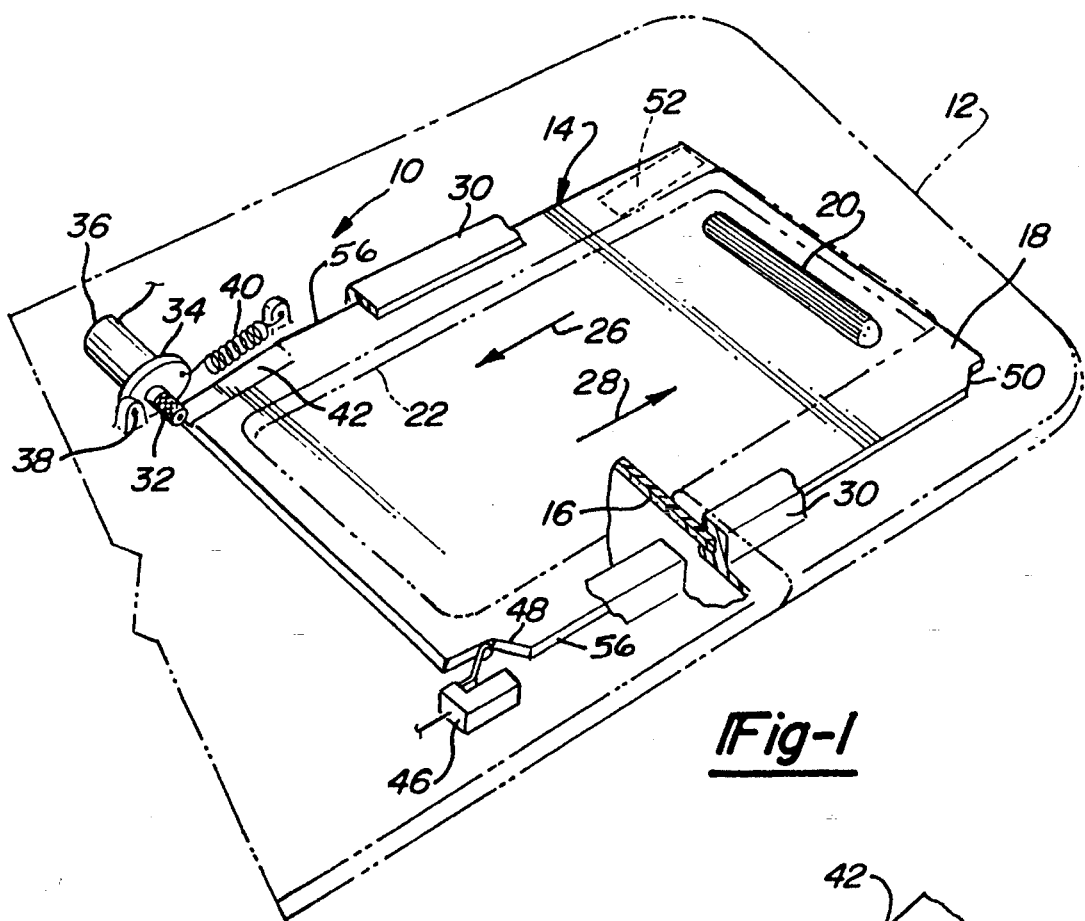
FIG. 1 is a perspective view with a portion broken away showing the reciprocating plate mechanism of the invention embodied in sliding door covering a vanity mirror in a vehicular sun visor.

The reciprocating plate mechanism 10 of this invention is illustrated in a vehicular sun visor shown in phantom at 12 in FIG. 1 wherein the sliding door 14 is arranged to cover a vanity mirror 16 in its closed position and to expose the mirror for use in its open position.

Examples of vehicular sun visors having a vanity mirror covered by a sliding door are shown in the following U.S. Patents in the name of co-inventor, Jay R. White and assigned to the assignee of the present invention, Jay Roberts Company: U.S. Pat. Nos. 4,653,798, 4,858,983, 5,054,839 and 5,205,689. The concept of a motor driven sliding door is shown in patent application Ser. No. 08/155,461, filed Nov. 19, 1993, also in the name of co-inventor Jay R. White and assigned to Jay Roberts Company.

The front surface 18 of the sliding door 14 has a handle 20 which projects through the mirror opening 22 in the visor 12. The rear surface 24 of the door overlies the mirror 16. It will be appreciated that a protruding handle is not necessary; for example, a depression or a series of serrations can be used.

The door 14 moves in a forward longitudinal direction shown by arrow 26 from a closed position to an open position, and it moves in a reverse longitudinal direction shown by arrow 28 from an open to a closed position. Door 14 is guided in these linear motions by longitudinal guides 30 and is driven by drive roller 32 through speed reducer 34 from electric rotary motor 36. The roller 32 is held in resilient contact with the front or rear surfaces 18 or 24 of door 14 along one of the door's longitudinally extending sides 56.

When the door 14 is stationary at its closed or open position, the drive roller 32 is out of contact with the door. When the door is urged into contact with the drive wheel 32, it engages one of the front or rear surfaces 18 or 24 to move the door in the forward or reverse directions 26 or 28. The motor 36 is always driven in one direction. As seen in FIGS. 1 and 2A–F the motor is driven in a clockwise direction, and the drive roller 32 is biased toward the door by the pivotal mounting at 38 of speed reducer 34 and the spring loading at 40. Referring to FIGS. 1 and 2A, when the vehicle occupant wants to use the mirror, he urges the handle 20 in the opening direction, moving the front surface ramp 42 into contact with drive roller 32 as seen in FIG. 2B.

In a preferred embodiment power to the motor 36 is off when the sliding door 14 is in its closed or open position. As the door is moved into contact with the drive wheel 32, as shown in FIG. 2B, the switch 46 contacts the ramp 48, as seen in FIG. 1, closing the switch to supply power to motor 36. As seen in FIG. 2C, the drive wheel 32 in contact with front surface 18 will then move the door 14 to its fully open position as shown in FIG. 2D. As the door reaches its fully opened position, the switch 46 will contact off ramp 50, as seen in FIG. 1, deenergizing the motor.

When the vehicle occupant is finished using the vanity mirror 16, pushing the handle 20 in the closing direction 28 as viewed in FIG. 2E, will move the rear surface ramp 52 into contact with the drive roller 32. Also as the door is pushed towards its closed position, the switch 46 will close as it contacts switching ramp 50 energizing the motor 36. The drive roller 44 still rotating in the clockwise direction, in contact with rear surface 24 will move the door 14 to its fully closed position as indicated in FIG. 2F.

Figure 3:
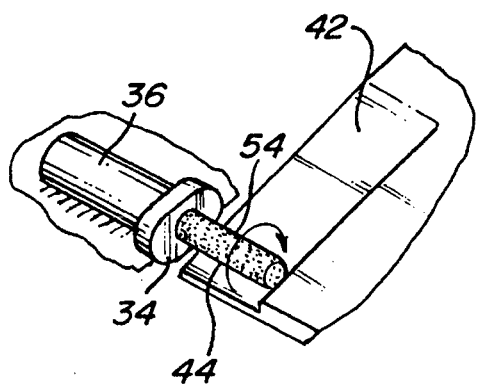
FIG. 3 is a partial perspective view of another embodiment of the invention.
Figure 4A:
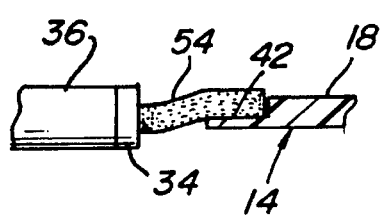
FIG. 4A is a partial end view of the reciprocating door mechanism of FIG. 3 showing the drive wheel in contact with the front surface of the door for opening the door.
Figure 4B:
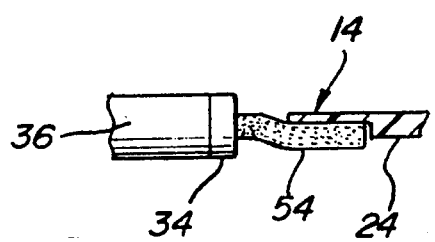
FIG. 4B is a partial end view similar to FIG. 4A showing the drive wheel in contact with the rear surface of the door for closing the door.

In the embodiments of FIGS. 3, 4A and 4B, the drive wheel 54 or its drive shaft is made with flexible or resilient material so as to provide the biasing force of the roller toward the front and rear door surfaces 18 and 24 and their respective starting ramps 42 and 52.

It will be apparent that many modifications can be made to accommodate various embodiments of the reciprocating plate mechanism of this invention. If it is desired to continuously reciprocate the plate or door, switching mechanism will not be necessary, and the drive roller 32 will switch from the front to the rear surface and from the rear to the front surface as it drops off an edge of the surfaces and is continually driven. The motor does not have to be in line with the drive wheel as illustrated. Packaging of the motor in restricted places, for example, could require the motor to be located at 90° to the drive shaft which can be accomplished with bevel gears.

We claim:

1. A reciprocating mechanism comprising:

a motor;

a drive wheel rotated by said motor;

an element having a front and rear surface; and a resilient member biasingly maintaining said drive wheel in resilient contact with said front surface for moving said element in a forward direction and for maintaining said drive wheel in resilient contact with said rear surface for moving said element in a reverse direction.

2. The mechanism according to claim 1 wherein said resilient member includes a pivotal mounting for said motor.

3. The mechanism according to claim 2 includes a spring mounted to said motor maintaining a force pivoting said motor towards said element.

4. The mechanism according to claim 2 wherein said drive wheel is resilient and comprises said resilient member.

5. The mechanism according to claim 1 including a switch for activating said motor when said drive wheel is in contact with one of said front and rear surfaces.

6. The mechanism according to claim 1 wherein said resilient member maintains said drive wheel in contact with said front and rear surfaces including starting ramps on said surfaces along a longitudinally extending side of said element.

7. The mechanism according to claim 6 wherein said element is a flat plate having a longitudinally extending side, and said drive wheel contacts said front and rear surfaces along said side.

8. The mechanism according to claim 7 wherein said element is a sliding door with said rear surface overlying a vanity mirror mounted in a vehicular sun visor so that when said drive wheel is in contact with said front surface, said door is moved in a forward direction from a closed position covering said vanity mirror to an open position exposing said vanity mirror for use, and when said drive wheel is in contact with said rear surface, said door is moved in a reverse direction from said open position to said closed position.

9. A sliding door mechanism for a vehicular sun visor having a vanity mirror comprising:

a motor;

a drive wheel rotated by said motor; and a sliding door having a front and rear surfaces with said rear surface overlying said vanity mirror, said door being mounted so that when said drive wheel contacts one of said front and rear surfaces, said door is moved in a forward direction from a closed position covering said vanity mirror to an open position exposing said vanity mirror for use, and when said drive wheel contacts an other of said front and rear surfaces, said door is moved in a reverse direction from said open position to said closed position.

10. The mechanism according to claim 9 including a switch for activating said motor when said drive wheel is in contact with one of said front and rear surfaces.

11. The mechanism according to claim 9 wherein said motor and drive wheel are positioned relative to said door so that when said door is in said closed position, and said door is moved in a forward direction, the drive wheel will engage said front surface of said door, moving said door in a forward direction from its closed position to its open position, and when said door is in said open position, and said door is moved in a reverse direction, the drive wheel will engage said rear surface of said door, moving said door in a reverse direction from its open position to its closed position.

12. The mechanism according to claim 11 wherein said motor is mounted to pivot said drive wheel toward and away from said door.

13. The mechanism according to claim 12 including a spring attached to said motor in a manner to pivot said drive wheel towards said door.

14. The mechanism according to claim 11 wherein said drive wheel is resilient.

* * * * *